United States Patent
Haenger et al.

(10) Patent No.: US 9,710,290 B2
(45) Date of Patent: Jul. 18, 2017

(54) DEVICE FOR THE RELIABLE INTEGRATION OF A SOFTWARE COMPONENT INTO A MOTOR VEHICLE

(71) Applicant: Robert Bosch GmbH, Stuttgart (DE)

(72) Inventors: Jochen Ulrich Haenger, Neckarwestheim (DE); Markus Schweizer, Vaihingen/Enz (DE); Carsten Gebauer, Boeblingen (DE); Bernd Mueller, Leonberg (DE); Christian Lasarczyk, Tamm (DE); Thomas Heinz, Stuttgart (DE); Rakshith Amarnath, Asperg (DE)

(73) Assignee: Robert Bosch GmbH, Stuttgart (DE)

( * ) Notice: Subject to any disclaimer, the term of this patent is extended or adjusted under 35 U.S.C. 154(b) by 176 days.

(21) Appl. No.: 14/717,828

(22) Filed: May 20, 2015

(65) Prior Publication Data

US 2015/0339133 A1   Nov. 26, 2015

(30) Foreign Application Priority Data

May 20, 2014  (DE) .................. 10 2014 209 489

(51) Int. Cl.
| | |
|---|---|
| G06F 11/30 | (2006.01) |
| G06F 9/445 | (2006.01) |
| H04M 1/725 | (2006.01) |
| G06F 21/53 | (2013.01) |
| G05B 9/02 | (2006.01) |

(52) U.S. Cl.
CPC ........... *G06F 9/44505* (2013.01); *G05B 9/02* (2013.01); *G06F 8/61* (2013.01); *G06F 21/53* (2013.01); *H04M 1/7253* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,854,283 A | * | 8/1989 | Kiyono | F02D 41/107 123/361 |
| 2011/0093916 A1 | * | 4/2011 | Lang | G06F 21/57 726/1 |
| 2012/0330501 A1 | * | 12/2012 | Sundaram | G05B 23/0248 701/33.9 |
| 2014/0025979 A1 | * | 1/2014 | Yagi | G06F 1/3215 713/323 |
| 2014/0173548 A1 | * | 6/2014 | Greb | G06F 11/008 716/136 |
| 2014/0259143 A1 | * | 9/2014 | Kuhnl | G08C 25/00 726/11 |

(Continued)

*Primary Examiner* — Edward J Pipala
(74) *Attorney, Agent, or Firm* — Norton Rose Fulbright US LLP; Gerard Messina

(57) ABSTRACT

A coupling device for coupling a software component, which transmits a setting command for setting an actuator on a control system of a motor vehicle, to the control system, the coupling device including a monitoring unit, which is designed to carry out an assessment for each setting command as to whether its implementation will transfer the motor vehicle into a dangerous state, the coupling device being further designed to transmit, as a function of this assessment, a monitored setting command corresponding to the setting command to an implementation unit, the implementation unit being designed to control the actuator.

12 Claims, 2 Drawing Sheets

(56) References Cited

U.S. PATENT DOCUMENTS

| | | | | |
|---|---|---|---|---|
| 2014/0358346 | A1* | 12/2014 | Katrak | G06F 1/26 |
| | | | | 701/22 |
| 2014/0365034 | A1* | 12/2014 | Schilling | G08C 17/02 |
| | | | | 701/2 |
| 2015/0025748 | A1* | 1/2015 | Hagnander | B60W 50/02 |
| | | | | 701/45 |
| 2015/0142386 | A1* | 5/2015 | Vaucher | B60W 50/0225 |
| | | | | 702/183 |
| 2015/0210258 | A1* | 7/2015 | Erdem | B60T 8/885 |
| | | | | 701/29.2 |
| 2015/0212952 | A1* | 7/2015 | Wegner | G06F 8/67 |
| | | | | 711/152 |
| 2015/0241553 | A1* | 8/2015 | Gehrels | G01S 7/40 |
| | | | | 342/173 |
| 2016/0255154 | A1* | 9/2016 | Kim | H04L 9/00 |
| | | | | 726/25 |
| 2016/0304040 | A1* | 10/2016 | Narisawa | G06F 9/4881 |

\* cited by examiner

DEVICE FOR THE RELIABLE INTEGRATION OF A SOFTWARE COMPONENT INTO A MOTOR VEHICLE

BACKGROUND INFORMATION

In cell phones, it is a part of the related art that the user acquires access to numerous additional software components and programs through the unit and the software installed in it. For these programs, the name "app" is usual. App's are easy to obtain, as a rule, (for instance, from app stores) and to install, and they enable a multitude of different applications, which in part go far beyond the original basic functionalities of the cell phone. This simple and voluminous personalization of the unit has meanwhile become a very important buying criterion for users.

Similar design approaches to those in the cell phone field already exist occasionally for Infotainment systems in motor vehicles. In that case too, the driver is able to obtain and install applications for the personalization of his Infotainment system via appropriate app stores.

SUMMARY

In order to secure the basic system on which the app runs and which it accesses (that is a system or a subsystem for controlling the motor vehicle), from faultily programmed app's, corresponding software and/or hardware measures are conceivable for the protection of the memory and for assuring the correct runtime behavior. Memory protection units or memory management units or a corresponding digital rights management in the microcontroller plane are possible mechanisms.

These mechanisms may be effective measures of preventing the influence of faulty apps on the basic system (also referred to as "freedom from interference"), and thus to increase the security of the basic system. From here on, we shall be concerned with the concept of safety (protection from unacceptable risks to life and limb) and not with the concept of security (protection of access, protection from intruders, protection from data falsification, etc.).

A further possible mechanism for increasing the safety of the basic system is to provide restrictions, when setting the apps in the app stores mentioned, and at least partially also during access to app stores. These restrictions may also have the aim of not letting apps, having a potentially negative effect on the basic system, reach the basic system in the first place.

In the development of motor vehicles, with respect to safety, among other things, Standard ISO 26262 has to be taken into account which, as a function, among other things, of the momentousness and the probability of occurrence of malfunctions, assigns an ASIL classification to the components. From this ASIL classification one may then derive the extent to which special countermeasures for preventing these malfunctions have to be provided. If an app is installed subsequently on a motor vehicle and may have an effect on actuators that are critical to safety, ISO 26262 should also be taken into consideration for these apps, which makes the development of such apps very effortful.

The abovementioned implementations of the app idea have in common that they should not run on safety-relevant systems within the meaning of ISO 26262, and that, in particular, may not have an influence on actuators critical to safety.

The possibility that apps could have such an influence is, however, desirable. Today's control units for safety-relevant systems in motor vehicles are programmed at the end of the assembly line, i.e. the functional scope is established with the mass production delivery to the customer. However, there exists the possibility of subsequently having certain functions "activated" in a workshop. This is achieved in the workshop, in that, using a diagnostic tester, software switches are switched in a data field of the control unit. This means, however, that the function "activated" thereby was already present in the control unit at delivery, but was inactive via a corresponding software switch. In addition, there is also the possibility in the workshop of updating the complete software situation. This possibility is also characterized in that a previously known combination of software, that is able to be validated ahead of time and released, is loaded onto the control unit.

By contrast, the present invention has the advantage that the application of apps, or more generally of software components is broadened to application cases in which these software components are also able to have an effect on safety-relevant actuators. This makes it possible for a new functionality to be safely loaded subsequently into a motor vehicle after delivery from mass production.

The software component is able to transmit a setting command for setting the actuator to a control system via which the actuator is actuated. The actuator will then set or try to set this setting command. Consequently, the software component has an influence on the actuator.

According to one aspect of the present invention, it is provided that a coupling device for coupling the software component, which transmits the setting command, for setting the actuator, to the control system of the motor vehicle, is provided with the control system. The coupling device, in this case, includes a monitoring unit which is designed to carry out an assessment for each setting command as to whether its implementation will transfer the motor vehicle into a dangerous state. The word "dangerous" is used in this case within the meaning of a reduced safety in the sense specified above.

Furthermore, the coupling device is designed, in dependence upon this assessment, to transmit a monitored setting command to an implementation unit, the implementation unit being designed to control the actuator. The monitored setting command, in this case, corresponds to the original setting command but is monitored to the extent that the original setting command, under certain circumstances, is not transmitted unaltered to the implementation unit, if by its implementation the motor vehicle would be transferred into a dangerous state.

The basic system, which integrates software components via this coupling device, is thus able to prevent an undesired influence of the software component. The ASIL classification of the basic system therefore does not propagate further to the software component, since the safety mechanisms of the coupling device are already tied into the basic system. Therefore, in principle, the software component may originate from any source, i.e. a wide circle of development is available for its development, and it is not limited to a few specialized suppliers.

According to one refinement, it may be provided that the coupling device is designed to transmit the monitored setting command unaltered to the implementation unit, if the assessment says that the implementation of the setting command will not transfer the motor vehicle into a dangerous state, i.e. the monitored setting command is equal to the original setting command.

According to one further refinement, it may be provided that the coupling device is designed, instead of the setting command, to transmit a substitute setting command to the implementation unit, if the assessment says that the implementation of the setting command will not transfer the motor vehicle into a dangerous state.

This substitute setting command may particularly be selected so that the implementation of the substitute setting command does not transfer the motor vehicle into a dangerous state.

Alternatively or in addition, there comes about a particularly simple generation of the substitute setting command by a limitation of the setting command, i.e. a numerical value of the setting command is limited to a value range less than a maximum value and/or greater than a minimum value.

Alternatively or in addition, a further especially simple implementation of the coupling device may provide that no setting command is transmitted to the implementation unit, if the assessment says that the implementation of the setting command transfers the motor vehicle into a dangerous state.

According to a further aspect, it may be provided that the coupling device includes a situation detection unit, which is designed to ascertain and provide a current and/or future, especially predicted driving situation of the motor vehicle, the coupling device being designed to carry out the assessment as a function of this provided driving situation. Thereby it is possible to limit or prevent the influence of the software component as a function of the situation. When taking a trip on a clear road of a superhighway, having little surrounding traffic, it is possible, for example, to grant to the software component greater influence than shortly before the beginning of a construction site having dense environmental traffic.

For this purpose, it may be provided, for instance, that the monitoring unit is designed to carry out a prediction of variables that describe the dynamics of the motor vehicle, and to carry out the assessment as a function of values of these variables. For example, it is thus possible to ascertain future values of a yaw rate or an attitude angle, in order to identify particularly critical situations for the influence of the software component.

According to one further aspect, it may be provided that the coupling device includes an (e.g. standardized) interface, via which the software component of the coupling device transmits the setting command. An integration of the software component is then particularly simple.

According to one further aspect, it may be provided that the coupling device includes a management unit such as an app manager, which is designed to check, before the installation of the software component, whether a correct installation of the software component is possible.

According to one advantageous refinement, it may be provided that the management unit is designed to assign to the software component a storage area in a working memory, and to connect the software component to the interface.

According to a further aspect, it may be provided that all the units of the coupling device are developed on a single control unit, for instance, an engine control unit or an ESP control unit. Such a partitioning of the coupling device is particularly simple.

In a further aspect, the present invention relates to such a control unit, which includes all the units of the coupling device according to the present invention.

In a still further aspect, the present invention relates to a control unit for operating the coupling device which includes at least the monitoring unit.

DETAILED DESCRIPTION

Figure 1:
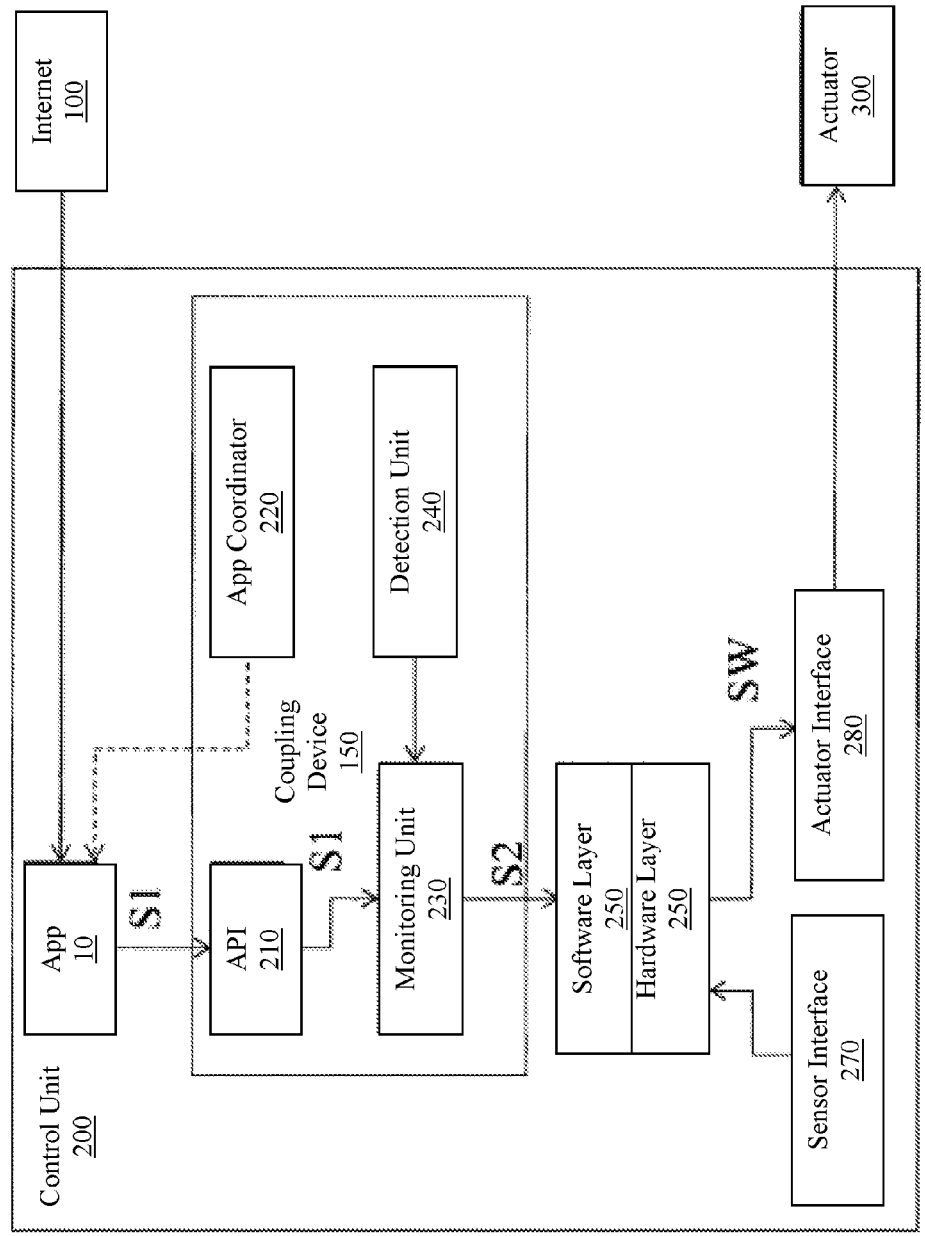
FIG. 1 shows the design layout of the coupling device in a control unit.

FIG. 1 shows coupling device 150 which, in this exemplary embodiment is integrated into a control unit 200 (for instance, the engine control unit). As an example of a software component, an app 10 is downloaded, for instance, from the Internet 100. An optional app coordinator 220 checks whether installation assumptions for app 10 are satisfied, such as whether sufficient free storage space is present. If this is the case, app coordinator 220 assigns app 10 a storage area in a memory (not shown) of control unit 200, and connects app 10 with an application programming interface ("API" for short) 210. During operation, app 10 transmits via API 210 a setting command S1 to monitoring unit 230. A situation detection unit 240 may optionally be provided, which transmits to monitoring unit 230 a current driving situation of the motor vehicle. The current driving situation may include both driving dynamics parameters of the motor vehicle (travel speed, yaw rate, etc.) and environmental parameters (traffic density, distance from preceding vehicle, etc.) or internal parameters of the motor vehicle (presence of a braking intervention, fuel injection quantity, etc.).

Monitoring unit 230 checks whether an implementation of setting command S1 would lead to an impairment of safety, and generates, based on this checking, as a function of monitored setting command S1, the monitored setting command S2 which is transferred to a software layer 250, for implementation. Software layer 250 may, for instance, be designed to modify a setting command S2, so that it may be transferred to actuator 300. It is conceivable, for example, that the monitored setting command S2 corresponds to a setpoint speed of the motor vehicle. Software layer 250 may then either transfer this setpoint speed to a cruise control, as the actuator, as the setting command. It is, however also possible, that software layer 250 takes over the function of the cruise control and, as a function of an actual speed of the motor vehicle, increases or reduces a fuel injection quantity, for example.

Coupling device 150 includes API 210, monitoring unit 230 and, optionally, app coordinator 220 and/or situation detection unit 240. In the exemplary embodiment, the coupling device is implemented completely on the one control unit 200, but this is not absolutely necessary. A subdivision of the components to a plurality of control units is also conceivable. Even the storage area of app 10 does not absolutely have to be implemented on this one control unit 200.

Software layer 250 communicates with an hardware layer 260, which receives, via a sensor interface 270, from sensors (not shown) values of current measured values, and is able to control the actuator 300 via an actuator interface 280. Hardware layer 260 transmits to actuator interface 280 a setting command value SW, which corresponds, for example, to a numerical value of monitored setting command S2. Actuator interface 280 controls actuator 300 according to this setting command value SW.

Figure 2:
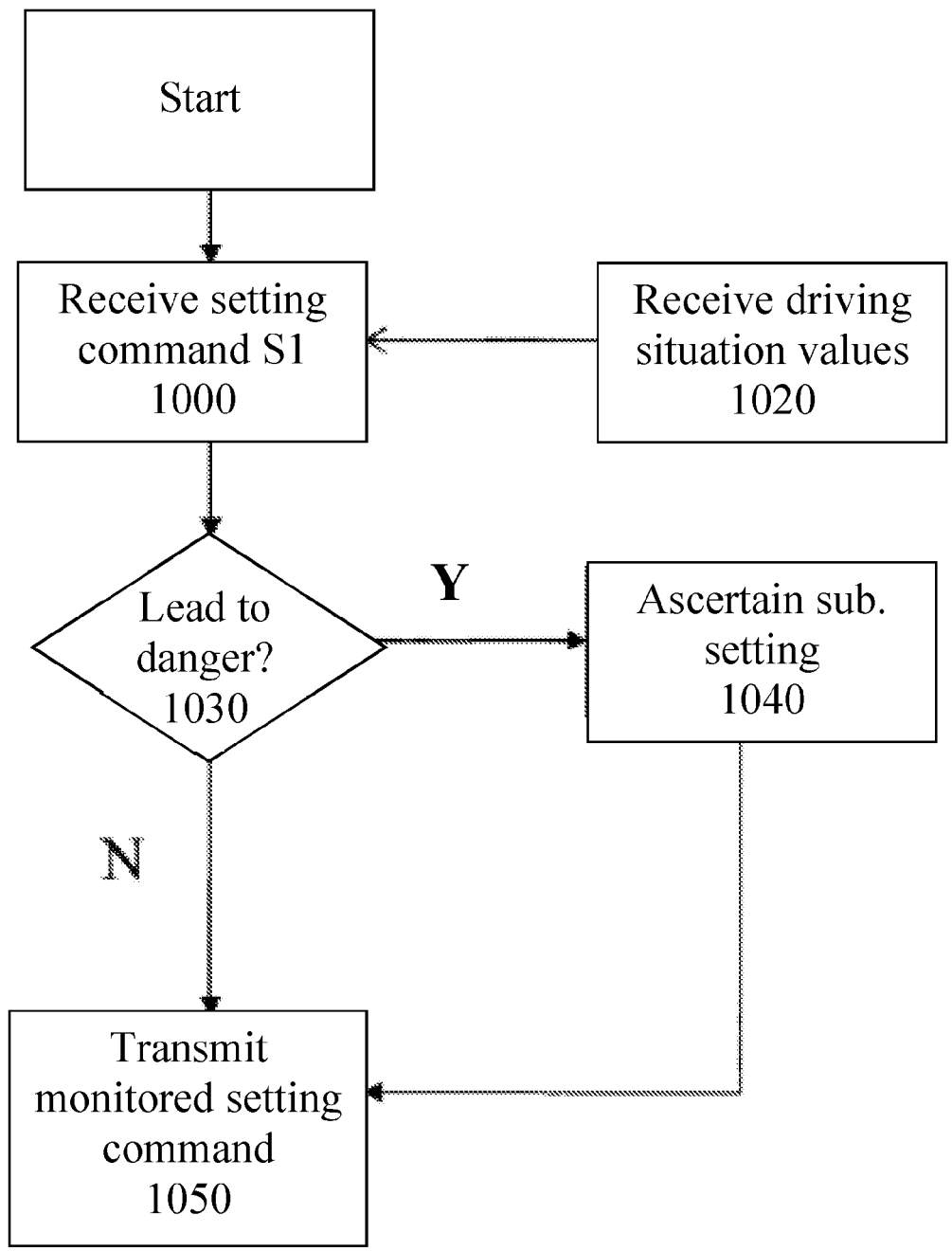
FIG. 2 shows the sequence of a monitoring method which is carried out in the coupling device.

FIG. 2 shows a sequence of a monitoring method according to a further aspect of the present invention. This monitoring method runs, for example, in coupling device 150, particularly in monitoring unit 230.

The method begins with step 1000. Monitoring unit 230 receives setting command S1 from app 10. Setting command S1 is a numerical value or a number of numerical values, which may be specifically assigned to actuator 300, or may also relate to the behavior of the motor vehicle as a whole, for instance, a desired acceleration value.

Monitoring unit 230 optionally receives from situation detection unit 240, in a step 1020, values on the current driving situation, such as the current speed, a current steering angle or even a current coefficient of friction of the roadway on which the motor vehicle is traveling, which may be estimated from an attitude angle, for example, or ascertained from a fine digital map, or estimated within the meaning of a glare ice detection, for example, via an outside temperature sensor (not shown).

Monitoring unit 230 now ascertains, in step 1030, whether setting command S1 could lead to a dangerous driving situation, if it were implemented. If this is the case, step 1040 follows, otherwise step 1050.

In step 1040, a substitute setting command is ascertained as monitored setting command S2. This substitute setting command may be a limitation of the numerical value of setting command S1, in the example, it is a limitation of the acceleration value. It is also conceivable, however, that the substitute setting command is an empty setting command S2, so that no setting command S2 is transmitted to software layer 250, i.e. the system acts as if app 10 had not transmitted any setting command S1. Subsequently, there follows step 1050.

If, however, setting command S1 is classified as safe, step 1050 follows directly, whereby as the monitored setting command S2, precisely setting command S1 is transferred.

In step 1050, monitoring unit 230 transmits the monitored setting command S2 to software layer 250. The further sequence in the basic system takes place, for instance, as is described above, in connection with FIG. 1.

What is claimed is:

1. A coupling device for coupling a software component to a control system of a motor vehicle to control a setting of an actuator by the control system, the coupling device comprising:
   a monitoring unit that is configured to:
      obtain, via an application program interface, a setting command generated by an on-board processor of the control system of the motor vehicle executing the software component;
      assess the setting command as to whether an implementation of the setting command will transfer the motor vehicle into a dangerous state;
      generate, as a function of the assessment, a monitored setting command corresponding to the obtained setting command; and
      pass the generated monitored setting command to the on-board processor to control the actuator based on the monitored setting.

2. The coupling device as recited in claim 1, wherein the monitored setting command is set to be the same as the obtained setting command if the assessment is that the implementation of the obtained setting command does not transfer the motor vehicle into the dangerous state.

3. The coupling device as recited in claim 1, wherein the monitored setting command is set to be different than the obtained setting command if the assessment is that the implementation of the obtained setting command transfers the motor vehicle into the dangerous state.

4. The coupling device as recited in claim 3, wherein the monitored setting command is selected so that an implementation of the monitored setting command does not transfer the motor vehicle into the dangerous state.

5. The coupling device as recited in claim 3, wherein the monitored setting command represents a limitation of the obtained setting command.

6. The coupling device as recited in claim 1, wherein the monitoring unit is configured to respond to the assessment being that the implementation of the obtained setting command transfers the motor vehicle into the dangerous state by not passing any setting command for control of the actuator based on the obtained setting command.

7. The coupling device as recited in claim 1, wherein the monitoring unit is configured to carry out the assessment as a function of an ascertained driving situation.

8. The coupling device as recited in claim 1, wherein the monitoring unit carries out a prediction of variables that describe dynamics of the motor vehicle, and carries out the assessment as a function of values of the variables.

9. The coupling device as recited in claim 1, further comprising a management unit for checking, before an installation of the software component, whether a correct installation of the software component is possible.

10. The coupling device as recited in claim 9, wherein the management unit assigns a storage area in a working memory to the software component, and connects the software component to the application program interface.

11. The coupling device as recited in claim 1, wherein the monitoring unit is configured to compare a value of the obtained setting command to a limit value, and, responsive to determining that the value of the obtained setting command does not meet the limit value, modify the value to satisfy the limit value, the modified value being used for the monitored setting command.

12. A control system of, and on board, a motor vehicle comprising:
   an interface;
   a data storage; and
   a processor;
   wherein the processor is configured to:
      receive, via the interface and from off board the vehicle, a new software component;
      store the received software component locally in the data storage;
      execute the stored software component using an application program interface to obtain a setting command;
      execute a monitoring function to:
         assess the setting command as to whether an implementation of the setting command will transfer the motor vehicle into a dangerous state; and
         generate, as a function of the assessment, a monitored setting command corresponding to the obtained setting command; and
      execute actuator controlling software to control an actuator based on the monitored setting.

* * * * *